(12) United States Patent
Ikeda et al.

(10) Patent No.: US 7,105,632 B2
(45) Date of Patent: Sep. 12, 2006

(54) RECYCLE METHOD FOR POLYCARBONATE RESIN WASTE

(75) Inventors: Akio Ikeda, Otake (JP); Takato Kimura, Ichihara (JP); Tomoaki Shimoda, Ichihara (JP)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/707,033

(22) Filed: Nov. 17, 2003

(65) Prior Publication Data

US 2004/0116642 A1  Jun. 17, 2004

(30) Foreign Application Priority Data

Dec. 11, 2002  (JP) .............................. 2002-359578

(51) Int. Cl.
*C08F 6/00* (2006.01)
(52) U.S. Cl. .................. 528/480; 264/176.1; 264/219; 526/67
(58) Field of Classification Search ............. 264/176.1, 264/219; 526/67; 528/480
See application file for complete search history.

(56) References Cited

U.S. PATENT DOCUMENTS 5,652,275 A  7/1997  Buysch et al. ................ 521/48

2003/0065130 A1 *  4/2003  Hahnsen et al. ............ 528/271

FOREIGN PATENT DOCUMENTS

| DE | 46353 | | 7/1963 |
| JP | 07316280 | * | 1/2003 |

OTHER PUBLICATIONS

Japanese Patent No. JP63215763; Publication Date: Sep. 8, 1988; Abstract Only; 1 page.
Japanese Patent No. JP62020184; Publication Date: Jan. 28, 1987; Abstract Only; 2 pages.
Japanese Patent No. JP10016280; Publication Date: Jan. 20, 1998; Abstract Only; 2 pages.
Japanese Patent No. JP11152371; Publication Date: Jun. 8, 1999; Abstract Only; 2 pages.
Japanese Patent No. JP02124934; Publication Date: May 14, 1990; Abstract Only; 2 pages.
International Search Report dated Jun. 17, 2004.

* cited by examiner

*Primary Examiner*—Terressa Boykin

(57) ABSTRACT

Disclosed is a method for recycling polycarbonate using melt polycondensation apparatus. A polycarbonate polycondensation component is introduced into transesterification polymerization equipment and subjected to one or both of a transesterification reaction and a polycondensation reaction. The polycarbonate polycondensation component has an OH group concentration and comprises one or both of polycarbonate waste resin and polycarbonate oligomer. The OH group concentration of the polycarbonate polycondensation component is adjusted either before or during the transesterification and/or polycondensation reactions.

25 Claims, 4 Drawing Sheets

RECYCLE METHOD FOR POLYCARBONATE RESIN WASTE

CROSS REFERENCE TO RELATED APPLICATIONS

The present application is a U.S. non-provisional application based upon and claiming priority to Japanese Application No. 2002-359578 filed Dec. 11, 2002, the entire contents of which are hereby incorporated by reference.

BACKGROUND OF INVENTION

Disclosed is an economical method of recycling polycondensation resin waste.

Polycarbonates are a high value material that is used in product applications like lenses, compact discs, construction materials, automobile parts, chassis of office appliances, camera bodies, bottles, fibres, etc. The demand for these resins is increasing.

After use, these products are processed by burning or burying them underground as waste. However, recovery and recycling of these wastes may be advantageous from the viewpoint of environmental protection and/or cost, and especially if the recycled product could be reused.

For example, polycarbonate resin wastes are used after partial remolding. When remolding is carried out, it has the problems of lowering of molecular weight, deterioration of physical properties like strength, and discoloration of the material, all of which make large-scale reapplication difficult. The material is discarded after one reuse. Thus, it is not recycling in the true sense.

Various methods for reusing polycarbonate resin wastes are known. For example, Kokai no. 6-220184 discloses a method for reuse of polycarbonate, wherein waste polycarbonate is dissolved in monophenol and made to undergo depolymerisation (disintegration) in the presence of a quaternary ammonium compound or quaternary phosphonium compound catalyst to form a mixture of oligocarbonate, and diphenol. The oligocarbonate is then polycondensed.

Kokai no. 7-316280 has mentioned a recycling method where the aromatic dihydroxy compound or diaryl carbonate obtained by disintegration of aromatic polycarbonate resin waste, is used again as a raw material for the preparation of aromatic polycarbonate resin. In this method, aromatic polycarbonate raw material of aromatic dihydroxy compound and diaryl carbonate are recovered by transesterification reaction between aromatic polycarbonate waste and aromatic monohydroxy compound, through the following steps: (A) In step I aromatic polycarbonate resin and aromatic monohydroxy compound are subjected to transesterification reaction, (B) in step II, diaryl carbonate containing aromatic monohydroxy compound is 1separated by distillation from the reaction product of the Step 1, (C) in step 3 where aromatic monohydroxy compound is added to aromatic dihydroxy compound left as residue in step 2 and is heated to form their addition product and the addition product is separated after it is deposited out as crystals by cooling, and (D) step 4 in which the crystals obtained in Step 3 are heated and melted, and aromatic monohydroxy compound is distilled off to obtain aromatic dihydroxy compound.

The above methods may be described as the depolymerization of high molecular weight polycarbonates made with high energy processes energy, wherein the depolymerization process also requires high energy inputs. Thus, such process is not energy efficiency.

Furthermore, Kokai no. 11-152371 mentions a method of solid phase polymerisation where the polycarbonate is not depolymerized. In this method, after dissolving the polycarbonate waste in a solvent, the dissolved polycarbonate component is crystallised. However, this process requires solvent and is not satisfactory from the viewpoint of energy efficiency and environmental hygiene.

It would thus be advantageous to provide a method of recycling polycarbonate resin waste wherein the waste is used in a fusion polymerisation apparatus to obtain polycarbonate resin with high-energy efficiency.

SUMMARY OF INVENTION

Disclosed herein are methods of recycling polycarbonate waste resin. One method of recycling polycarbonate waste resin, comprises: subjecting a polycarbonate waste component to one or both of a transesterification reaction and a polycondensation reaction, wherein the polycarbonate waste component has an OH group concentration and comprises polycarbonate resin waste; and adjusting the OH group concentration of the polycarbonate waste component.

Another embodiment of the method of recycling polycarbonate resin waste, comprises: introducing a dihydroxy compound and a carbonate diester to a mixing tank to form a mixing tank composition; directing the mixing tank composition to a prepolymerization tank to form a prepolymerization composition; melting a polycarbonate waste component, wherein the polycarbonate waste component has an OH group concentration and comprises polycarbonate resin waste; combining the prepolymerization composition with the melted polycarbonate waste component to form a combination; adjusting the OH group concentration of the polycarbonate waste component; polymerizing the combination to form a polycarbonate product; and extruding the polycarbonate product.

The above described and other features are exemplified by the following figures and detailed description.

DETAILED DESCRIPTION

Figure 1:
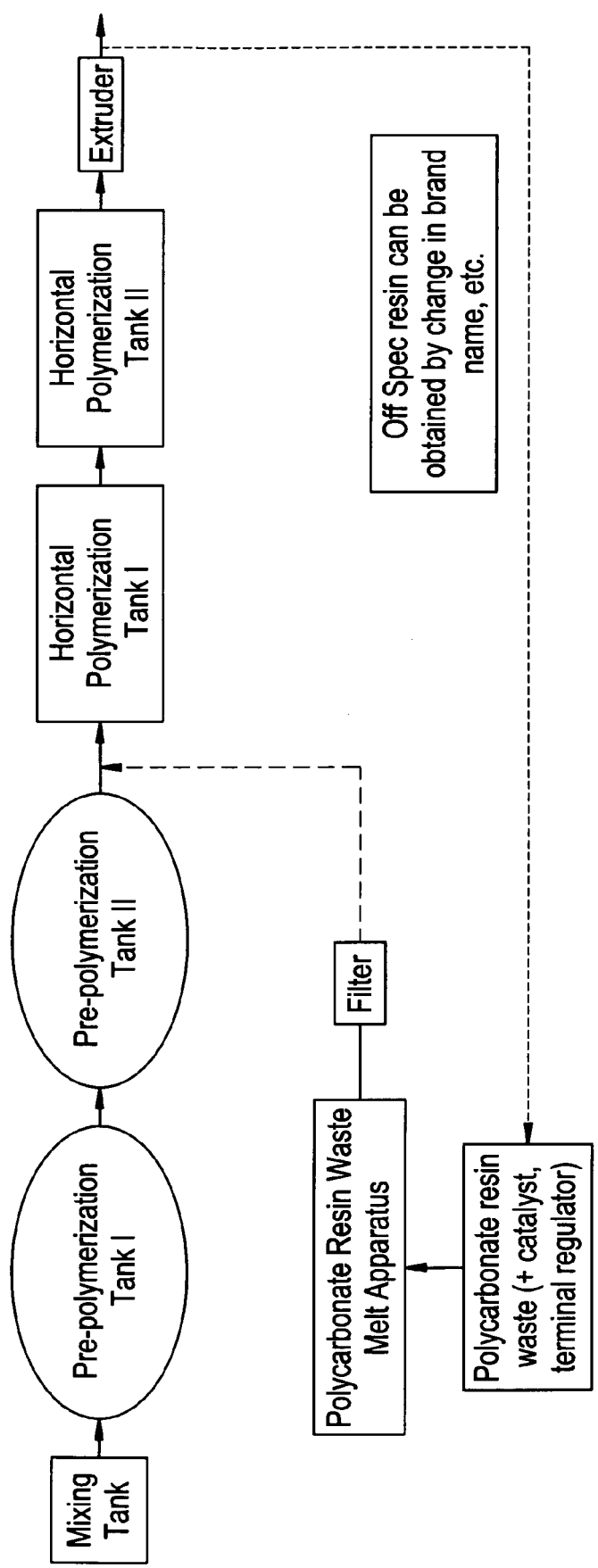
FIG. 1 is a flow diagram representing the disclosed recycling method for polycarbonate waste resin in III condition.

Polycarbonate resin waste used can be prepared by transesterification or the interface method. The OH concentration, the base point for transesterification, for polycarbonate obtained by transesterification reaction and polycarbonate obtained by interface method is different, and hence reaction speed also differs. For this reason, problems such as increase in reaction speed can result if polycarbonate resin waste is simply added to a transesterification apparatus.

While not wishing to be bound by a particular theory, it is believed that these difficulties can be addressed by adjusting the OH concentration of the transesterification system or apparatus to which the polycarbonate resin waste is added. In other words, the disclosed recycling method for polycarbonate waste resin can employ adjusting OH group concentration of polycarbonate polycondensation component contained in transesterification system when polycarbonate waste resin and/or polycarbonate oligomer are added to transesterification polymerization equipment and polycondensation reaction is carried out.

In addition, the disclosed method of recycling polycarbonate resin can employ adjusting the terminal OH group concentration of polycarbonate oligomer in advance when polycarbonate waste resin is added to transesterification polymerization equipment and transesterification reaction/polycondensation reaction is carried out during the recycling method for polycarbonate.

The recycling method for polycarbonate resin, wherein the waste polycondensation resin in which terminal OH concentration is adjusted, is supplied from the outlet of a polymerisation reactor in the first step of the polycondensation process (oligomerisation process) to carry out transesterification reaction and/or polycondensation reaction between the waste resin supplied and the resin being prepared in the second stage of the polycondensation process during the preparation of polycarbonate resin in a continuous melt-polycondensation apparatus with more than one polymerisation reactor connected in series.

In the above-mentioned method, a suitable polycarbonate is an aromatic polycarbonate. A terminal regulator can also be added in the disclosed method. In one exemplary embodiment, the terminal regulator is an aromatic dihydroxy compound such as bisphenol-A.

Disclosed is a method of recycling polycarbonate resin, comprising introducing a polycarbonate polycondensation component to transesterification polymerization equipment and comprising at least one of polycarbonate resin waste, polycarbonate oligomer, and mixtures thereof, subjecting the polycarbonate polycondensation component to one or both of a transesterification reaction and a polycondensation reaction, and adjusting an OH group concentration of the polycarbonate polycondensation component. The disclosed method results in the preparation of new polycarbonate using recycled polycarbonate resin waste. As used herein, polycarbonate resin waste means both reused/recycled polycarbonate once used as a part of a useful product that has been discarded, as well as reused/recycled plastic made from excess polycarbonate material or defective parts discarded during the manufacturing process, and excludes polycarbonate that has been recycled in the process of manufacturing the product. However, there is no restriction as to the weight average molecular weight of polycarbonate resin waste suitable for use in the disclosed method.

Suitable polycarbonate resin waste can be resin recovered from waste molding articles and resins that are prepared but do not meet required standards (e.g., below standard products produced due to change in brand, initial stages of operation, etc.), waste produced during molding, spool, below standard products during molding, molded articles with expired life, etc.

Common additive agents, such as heat resistant additives, weather resistant additives, lubricants, inorganic fillers, organic fillers, fire retardant additives, velocity regulating additives, catalysts, etc., can be added to such waste molded articles. Moreover, substances with plated surfaces, or painted surfaces can also be used.

Waste polycarbonate resin, such as that from molded articles, is crushed, filtered through screen mesh, and foreign material eliminated. Examples of exemplary embodiments of filtering through screen mesh include the sorting method for waste plastics, re-pelletization by extrusion, fusion, and kneading. Such processes can be operated simultaneously, or when removal of foreign material is required, it can be filtered through screen mesh along with the other two processes. The opening diameter of the eye of suitable mesh changes with the filtering requirement. In one embodiment, greater than or equal to about 10 mesh is preferred as per Japan Institute of Standards (JIS).

The crushed material of waste resin molded article can be used as it is for the fabrication of composition, but such use can negatively affect productivity and feeder processes due to the shape of crushed material, unstable extrusion, and the like. Therefore, in one exemplary embodiment, polycarbonate resin waste will be crushed material having a longitudinal direction of less than or equal to about 30 milliliters (mm).

Environmental particles such as dust, grease, and the like, may adhere to polycarbonate resin waste. Therefore, the surfaces of such waste may be cleaned, e.g., by a dry process, water or organic solvent, or wet washing method that uses an interfacial active agent.

Waste resin moldings often contain metal pieces depending on the application or recovery route. Contamination by such metal pieces affects the properties of the recycle material and can also cause major damage to extruders. Therefore, such metal pieces will generally be eliminated using metal detection.

Aromatic polycarbonate prepared by phosgene method or fusion method such as that disclosed in Kokai no. 63-215763 and 02-124934 can be used as polycarbonate waste resin. Polycarbonate waste resin may contain end-capping agents and various additive agents, such as stabilizers and catalysts used during polycondensation.

In the disclosed method, polycarbonate resin waste is added to a transesterification system in molten form. Polycarbonate waste resin containing additive agents that inhibit the reaction can be added to the polycondensation reaction and the polycondensation reaction advances smoothly by planning the kind of catalyst as well as optimization of quantity depending on OH concentration of the transesterification reaction. Moreover, there is no variation in the average molecular weight of the obtained polycarbonate, and it is possible to control the desired weight. The molecular weight of polycarbonate resin finally obtained can be controlled within the desirable range, even if the average molecular weight of polycondensation resin waste is higher or lower than what is desired in the final product While not wishing to be bound to a particular theory, it is believed that the polycarbonate resin waste added during the polycondensation reaction undergoes depolymerisation, transesterification reaction, or further polycondensation reaction.

Dihydroxy compound and carbonate diester are used as polycarbonate resin waste for recycling polycarbonate resin. Bisphenol represented by general Formula (I) can be used.

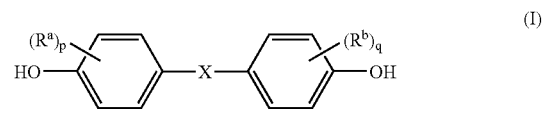

(I)

wherein $R^a$ and $R^b$ each represent a halogen atom or a monovalent hydrocarbon group and may be the same or different; p and q are each independently integers from 0 to 4; and $X^a$ represents one of the groups of

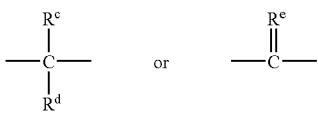

wherein $R^c$ and $R^d$ each independently represent a hydrogen atom or a monovalent linear or cyclic hydrocarbon group and $R^e$ is a divalent hydrocarbon group.

The concrete examples of bisphenol series represented by the above Formula (I) include bis(hydroxy aryl alkane) series, such as
1,1-bis(4-hydroxyphenyl)methane, 1,1-bis(4-hydroxyphenyl)ethane,
2,2-bis(4-hydroxyphenyl)propane (bisphenol-A),
2,2-bis(4-hydroxyphenyl)butane, 2,2-bis(4-hydroxyphenyl)octane,
1,1-bis(4-hydroxyphenyl)propane, 1,1-bis(4-hydroxyphenyl)n-butane,
bis(4-hydroxyphenyl)phenylmethane,
2,2-bis(4-hydroxy-1-methylphenyl)propane,
2,2-bis(4-hydroxy-1-methylphenyl)propane,
1,1-bis(4-hydroxy-t-butylphenyl)propane,
2,2-bis(4-hydroxy-3-bromophenyl)propane; bis(hydroxyaryl)cycloalkane series, such as 1,1-bis(4-hydroxyphenyl)cyclopentane,
1,1-bis(4-hydroxyphenyl)cyclohexane, and the like as well as combinations comprising at least one of the foregoing bisphenol series.

Bisphenol, where X may be —O—, —S—, —SO— or —SO$_2$— can also be used. Compounds represented by the general Formula (III) are illustrative examples:

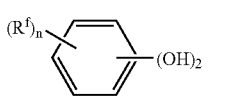

wherein $R^f$ is a halogen atom, a hydrocarbon group or a halogen-substituted hydrocarbon group having about 1 to about 10 carbon atoms; n is any integer of 0 to 4; and $R^f$ may be the same or different when n is 2 or more.

In one exemplary embodiment 3,3,3',3'-tetramethyl-1,1'-spirobi-[indane]-6,6'-diol represented by Formula (IV) given below will be used as the bisphenol in the disclosed method.

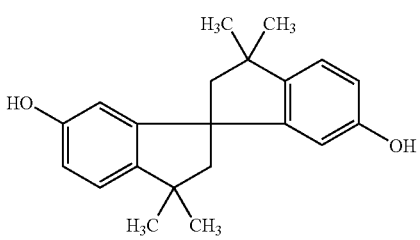

In one exemplary embodiment of the disclosed method, the bisphenol represented by the general Formula (I) above will be used, specifically bisphenol A.

In the disclosed method, at least two or three of dihydroxy compounds may be combined to prepare polycarbonate copolymer. Examples of suitable carbonate diester used in the disclosed method are diphenyl carbonate (DPC), bis(2,4-dichlorophenyl)carbonate, bis(2,4,6-trichlorophenyl)carbonate, bis(2-cyanophenyl)carbonate, bis(o-nitrophenyl) carbonate, ditolyl carbonate, m-cresyl carbonate, dinaphthyl carbonate, bis(diphenyl) carbonate, diethyl carbonate, dimethyl carbonate, dibutyl carbonate and dicyclohexyl carbonate, and mixtures comprising at least one of the foregoing. Among these, diphenyl carbonate will be used in one exemplary embodiment.

The carbonate diester used in the disclosed method of recycling can contain dicarboxylic acid or dicarboxylic acid ester. To be more specific, carbonate diester can contain dicarboxylic acid and/or dicarboxylic acid ester in an amount of less than or equal to about 50 mole %, preferably about 5 mole % to about 50 mole % within this range, and amount of less than or equal to about 30 mole % is preferred.

Illustrative examples of suitable dicarboxylic acid and dicarboxylic acid ester are terephthalic acid, isophthalic acid, sebacic acid, decanedioic acid, dodecanedioic acid, diphenyl sebacate, diphenyl terephthalate, diphenyl isophthalate and diphenyl decanedioic acid. The carbonate diester can contain at least two kinds of dicarboxylic acid or dicarboxylate ester.

Polycondensation of the above-mentioned carbonate diester containing dicarboxylic acid or dicarboxylate ester and the above mentioned aromatic dihydroxy compound forms polyester polycarbonate.

Generally, (a) alkali metal and/or alkali earth metal as alkali (earth) metal compound is used as the catalyst for fusion polycondensation. Among the suitable alkali (earth) metal compounds (a), organic acid salts, inorganic acid salts, oxides, hydroxides, hydrides, and/or alcoholate are used in some exemplary embodiments.

Illustrative examples of alkali metal compounds are sodium hydroxide, potassium hydroxide, lithium hydroxide, sodium hydrogen carbonate, potassium hydrogen carbonate, lithium hydrogen carbonate, sodium carbonate, potassium carbonate, lithium carbonate, sodium acetate, potassium acetate, lithium acetate, sodium stearate, potassium stearate, lithium stearate, sodium borohydride, lithium borohydride, phenyl sodium borohydride, sodium benzoate, potassium benzoate, lithium benzoate, disodium hydrogen phosphate, dipotassium hydrogen phosphate, dilithium hydrogen phosphate, rubidium dihydrogen phosphate, cesium dihydrogen phosphate, dilithium hydrogen phosphite (Li$_2$HPO$_3$), sodium dihydrogen phosphite (NaH$_2$PO$_3$), potassium dihydrogen phosphite (KH$_2$PO$_3$), rubidium dihydrogen phosphite (RbH$_2$PO$_3$), cesium dihydrogen phosphite (CsH$_2$PO$_3$), dilithium hydrogen phosphite (Li$_2$HPO$_3$), disodium hydrogen phosphite (Na$_2$HPO$_3$), dipotassium hydrogen phosphite (K$_2$HPO$_3$), dirubidium hydrogen phosphite (Rb$_2$HPO$_3$), dicesium hydrogen phosphite (Cs$_2$HPO$_3$), trilithium phosphite (Li$_3$PO$_3$), trisodium phosphite (Na$_3$PO$_3$), tripotassium phosphite (K$_3$PO$_3$), trirubidium phosphite (Rb$_3$PO$_3$), tricesium phosphite (Cs$_3$PO$_3$), disodium, dipotassium and dilithium salts of bisphenol A, and sodium, potassium and lithium salts of phenols, and mixtures comprising at least one of the foregoing compounds.

Illustrative examples of alkali earth metal compounds include calcium hydroxide, barium hydroxide, magnesium hydroxide, strontium hydroxide, calcium hydrogen carbonate, barium hydrogen carbonate, magnesium hydrogen carbonate, strontium hydrogen carbonate, calcium carbonate, barium carbonate, magnesium carbonate, strontium carbonate, calcium acetate, barium acetate, magnesium acetate, strontium acetate, calcium stearate, barium stearate, magnesium stearate and strontium stearate, and mixtures comprising at least one of the foregoing compounds.

The amount of alkali (earth) metal compound in one exemplary embodiment is about $1 \times 10^{-8}$ to about $1 \times 10^{-3}$ mole per mole of bisphenol. In other exemplary embodiments, about $1 \times 10^{-7}$ to about $2 \times 10^{-6}$ mole of alkali (earth) metal compound will be used per mole of bisphenol. In still other exemplary embodiments, about $1 \times 10^{-7}$ to about $8 \times 10^{-7}$ mole of alkali (earth) metal compound per 1 mole of bisphenol will be used during the fusion polycondensation reaction. If bisphenol, which is the raw material of the fusion polycondensation reaction, already contains alkali (earth) metal compound, the amount of the alkali (earth) metal compound to be added is preferably controlled in such a manner that its total amount is as specified above, with respect to the amount of the bisphenol, during the polycondensation.

In addition to the above-specified alkali (earth) metal compound (a), a basic compound (b) may also be used as the catalyst for the fusion polycondensation reaction. Examples of the basic compound (b) are nitrogen containing and phosphorus containing bases that are easily decomposed or are volatile at high temperature. Specifically, below mentioned compounds can also be used.

Illustrative examples of such bases are ammonium hydroxide containing alkyl, aryl or araryl groups, such as tetramethyl ammonium hydroxide ($Me_4NOH$), tetraethyl ammonium hydroxide ($Et_4NOH$), tetrabutyl ammonium hydroxide ($Bu_4NOH$) and trimethylbenzyl ammonium hydroxide ($\phi$—$CH_2(Me)_3NOH$); phosphonium hydroxide containing alkyl, aryl or araryl groups, such as tetramethyl phosphonium hydroxide ($Me_4POH$), tetraethyl phosphonium hydroxide ($Et_4POH$), tetrabutyl phosphonium hydroxide ($Bu_4POH$), and trimethylbenzyl phosphonium hydroxide ($\phi$—$CH_2(Me)_3POH$); tertiary amines like trimethylamine, triethylamine, dimethylbenzylamine, triphenylamine, etc.; secondary amines $R_2NH$ (wherein, R is alkyl group like methyl or ethyl, or aryl like phenyl or tolyl); primary amines $RNH_2$ (wherein, R is same as above); pyridines like 4-dimethylaminopyridine, 4-diethylaminopyridine, 4-pyrolidinopyridine; imidazole, such as 2-methylimidazole and 2-phenylimidazole; ammonia; and basic salts like tetramethylammonium borohydride ($Me_4NBH_4$), tetrabutylammonium borohydride ($Bu_4NBH_4$), tetramethylammonium tetraphenylborate ($Me_4NBPh_4$), tetrabutylammonium tetraphenylborate ($Bu_4NBPh_4$), tetramethylammonium acetate, tetrabutylammonium acetate, tetramethylammonium phosphate, tetrabutylammonium phosphate, tetramethylammonium phosphite, tetrabutylammonium phosphite, tetramethyl phosphonium borohydride ($Me_4PBH_4$), tetrabutyl phosphonium borohydride ($Bu_4PBH_4$), tetramethyl phosphonium tetraphenylborate ($Me_4PBPh_4$), tetrabutyl phosphonium tetraphenylborate ($Bu_4NBPh_4$), tetramethylphosphonium acetate, tetrabutyl phosphonium acetate, tetramethylphosphonium phosphate, tetrabutyl phosphonium phosphate, tetramethyl phosphonium phosphite, tetrabutyl phosphonium phosphite, and mixtures comprising at least one of the foregoing bases.

In one exemplary embodiment, the nitrogen-containing basic compound (b) can be tetra alkyl ammonium hydroxides and/or their salts, and/or tetra alkyl phosphonium hydroxides and/or their salts.

The above mentioned nitrogen-containing basic compound (b) may be added to the extent of about $1 \times 10^{-6}$ to about $1 \times 10^{-1}$ mole per mole of bisphenol. In one exemplary embodiment, the basic compound (b) will be used in an amount of about $1 \times 10^{-5}$ to about $1 \times 10^{-2}$ mole per mole of bisphenol.

In addition or alternatively, boric acid compound (c) may also be used as a catalyst. Such boric acid compounds (c) are boric acid and boric acid esters. Examples of boric acid esters can be represented by the general Formula (V):

$$B\ (OR)_n(OH)_{3-n} \qquad (V)$$

wherein R is an alkyl group such as methyl or ethyl or an aryl such as phenyl, and n is 1,2, or 3. Illustrative examples of such boric acid esters are trimethyl borate, triethyl borate, tributyl borate, trihexyl borate, triheptyl borate, triphenyl borate, tritolyl borate, and trinaphthyl borate.

The above-mentioned boric acid or boric acid ester (c) may be added to the extent of about $1 \times 10^{-8}$ to about $1 \times 10^{-1}$ moles per mole of bisphenol. In one exemplary embodiment, about $1 \times 10^{-7}$ to about $1 \times 10^{-2}$ moles boric acid or boric acid ester (c) per mole of bisphenol will be used. In another exemplary embodiment, about $1 \times 10^{-6}$ to about $1 \times 10^{-4}$ moles boric acid or boric acid ester (c) per mole of bisphenol will be used.

For example, in one exemplary embodiment, a combination of an alkali (earth) metal compound (a) and a nitrogen-containing basic compound (b) will be used as a catalyst for the fusion polycondensation. In another exemplary embodiment, a combination of (a), (b), and boric acid or a boric acid ester (c) is used as a catalyst for the fusion polycondensation reaction.

The use of a combination of an alkali (earth) compound (a) and the nitrogen-containing or phosphorus-containing basic compound (b) as a catalyst, added to the extent disclosed above, is advantageous because it advances the polycondensation reaction at a satisfactory rate and facilitates the formation of high molecular weight polycarbonate with a high polymerisation activity.

When using a combination of an alkali (earth) metal compound (a) and a nitrogen-containing basic compound (b), or a combination of (a), (b) and boric acid or a boric acid ester (c), the catalyst components may be added separately or after mixing to the fused mixture of the bisphenol and the carbonate diester.

The polycondensation of dihydroxy compound and carbonate diester can be carried out under reaction conditions used for polycondensation reaction. To be more specific, in the first stage of the reaction, bisphenol and carbonate diester can be allowed to react at about 80 to about 250° C., preferably about 100 to about 230° C., and most preferably at about 120 to about 190° C. for up to about 5 hours, preferably up to about 4 hours, and most preferably up to about 3 hours under normal pressure. After the first stage, the temperature is raised while bringing the reaction system under reduced pressure. Finally the temperature is brought to about 240 to about 320° C. and polycondensation is carried out between bisphenol and carbonate diester in this temperature range under a pressure of less than or equal to about 5 mm Hg. In one exemplary embodiment, the pressure will be lower than about 1 mm Hg.

Figure 2:
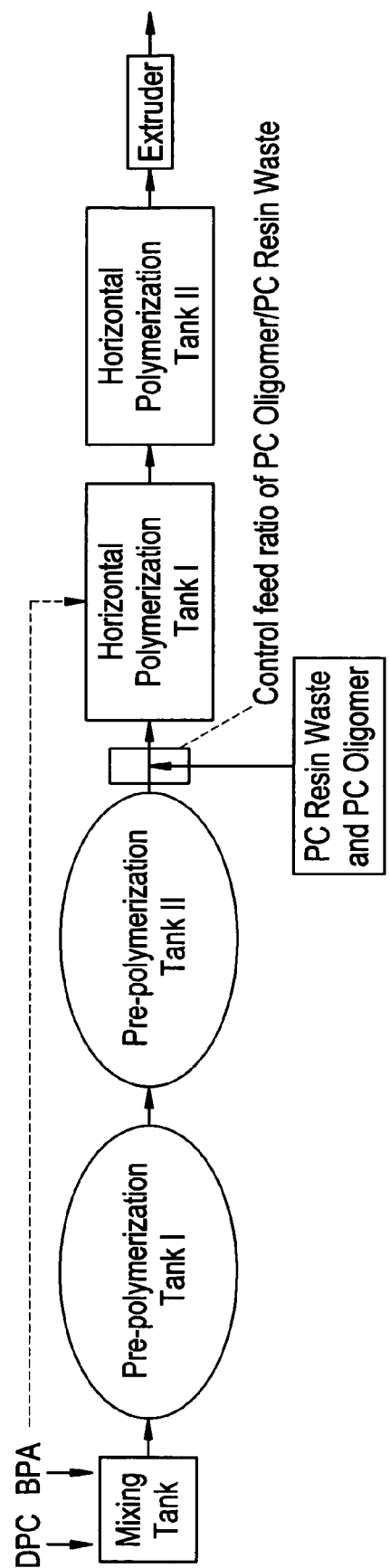
FIG. 2 is a flow diagram representing an embodiment of the disclosed recycling method for polycarbonate waste resin in I condition.

In reaction condition I, an example of which is illustrated in FIG. 2, the recycle method for polycarbonate resin comprises adjusting the OH concentration of polycarbonate polycondensed products contained in transesterification reaction during the progress of the polycondensation reaction when the polycarbonate waste resin or/and polycarbonate oligomer is added to the transesterification apparatus. The OH group concentration is based upon the degree of polymerization in the final product and target polymerization speed. In one exemplary embodiment, in the transesterification reaction, the OH concentration of the polycarbonate resin waste and polycarbonate oligomer, before polymerization is preferably about 200 to about 25,000 parts per million (ppm). In another exemplary embodiment, in the transesterification reaction, the OH concentration of the polycarbonate resin waste and polycarbonate oligomer unit present, before polymerization, is preferably about 500 to about 20,000 ppm, and more preferably about 500 to about 10,000 ppm. If OH concentration is in the above-mentioned range, the reaction will progress smoothly, and polycarbonate with outstanding hue, transparency, and less branched compound is obtained.

Polycarbonate polycondensed component refers to the mixture of polycarbonate oligomer, polycarbonate waste resin, polycarbonate resin waste depolymerized product, and aromatic dihydroxy compound present in the transesterification reactor.

The intrinsic viscosity of polycarbonate finally obtained by the disclosed method is about 0.1 to about 1.0 deciliter per gram (dl/g). In one exemplary embodiment, the intrinsic viscosity of polycarbonate obtained by the disclosed method of recycling is about 0.30 to about 0.65 dl/g. All intrinsic viscosity discussed herein is measured in methylene chloride of 0.5 dl/g concentration at 20° C. using an Ubbelohde viscometer.

Moreover, it is possible to polycondense even if the OH group concentration of the polycarbonate resin waste is changed. Either, polycarbonate with low OH concentration obtained by fusion method, or polycarbonate with high OH group concentration obtained by interface method (phosgene method) can be used.

The above mentioned polycondensation method can be operated continuously or batch wise. The apparatus for the above mentioned reaction can be tank type, tube type, or tower type.

Figure 3:
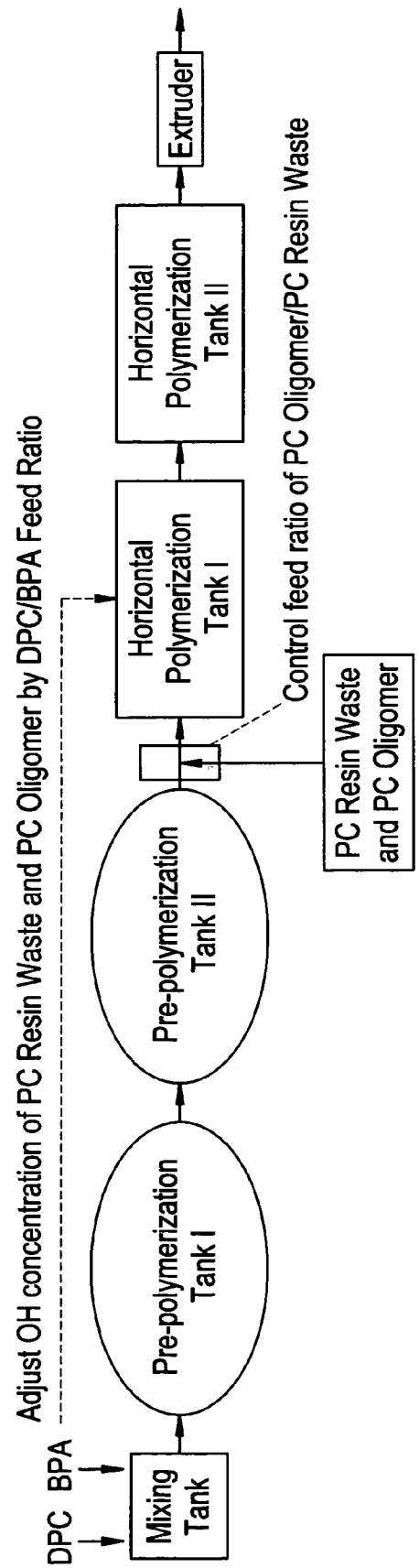
FIG. 3 is a flow diagram representing an embodiment of the disclosed recycling method for polycarbonate waste resin in III condition.

In the reaction II condition, an example of which is illustrated in FIG. 3, the disclosed method of manufacturing polycarbonate resin can be carried out using continuous fusion polycondensation apparatus where two or more polymerisation reactors are connected in series. During the polycondensation reaction or/and transesterification reaction, the OH group concentration in the reaction mixture is adjusted, in advance, so that the polymerisation degree of the final product and target polymerisation speed is attained. The speed is typically based upon processing efficiency.

Various reactors can be used during the disclosed recycling method of continuously preparing polycarbonate. It is desirable to use a different reactor of agitator style, specifically in the pre-polymerization stage where the viscosity of reaction product is low, as compared to the post-polymerization stage where the viscosity is high.

Examples of suitable reactors are vertical agitator reactor, thin-film evaporation reactor, vacuum chamber reactor, horizontal agitator reactor, biaxial vent extruder, etc. In one exemplary embodiment, it is desirable to use at least two reactors connected in series. In another exemplary embodiment, at least one of them is preferred to be a horizontal agitator reactor. Combinations of various reactors may be used. Illustrative examples of suitable combinations include vertical agitator reactor and horizontal agitator reactor, horizontal agitator reactor and vertical agitator reactor, horizontal agitator reactor and horizontal agitator reactor, vertical agitator reactor, vacuum chamber reactor and horizontal agitator reactor, and thin-film evaporation reactor and two horizontal agitator reactors.

In case of using combinations of at least two types, it is preferred that reactors should be connected in series. In one exemplary embodiment, at least one reactor will be a horizontal reactor, such as a horizontal agitator reactor. In exemplary embodiments where at least three reactors are connected in series, illustrative combinations include at least two vertical agitator reactors and one horizontal agitator reactor, at least one vertical agitator reactor and at least one thin-film evaporation reactor and at least one horizontal agitator reactor; and at least one vertical agitator reactor and at least two horizontal agitator reactors. The polycondensation reaction can be carried out efficiently, if at least two of the reactors are connected in series.

In one exemplary embodiment, the terminal OH concentration of polycarbonate oligomer at the time of addition of polycarbonate resin waste is about 200 to about 25,000 ppm, per unit weight of polycarbonate oligomer contained in transesterification reaction. In another exemplary embodiment, the terminal OH concentration of polycarbonate oligomer at the time of addition of polycarbonate resin waste is about 500 to about 20,000 ppm per unit weight of polycarbonate oligomer contained in transesterification reaction, with about 500 to about 10,000 ppm also possible.

The intrinsic viscosity of polycarbonate finally obtained by the disclosed method is about 0.10 to about 1.0 dl/g. In another exemplary embodiment, the intrinsic viscosity of polycarbonate obtained by the disclosed method of recycling is about 0.30 to about 0.65 dl/g.

In conditions I and II, the polycondensation reaction can be carried out even if OH group contained in polycarbonate resin waste is changed. Either, polycarbonate with low OH concentration obtained by fusion method, or polycarbonate with high OH group concentration obtained by interface method (phosgene method) can be used.

Figure 4:
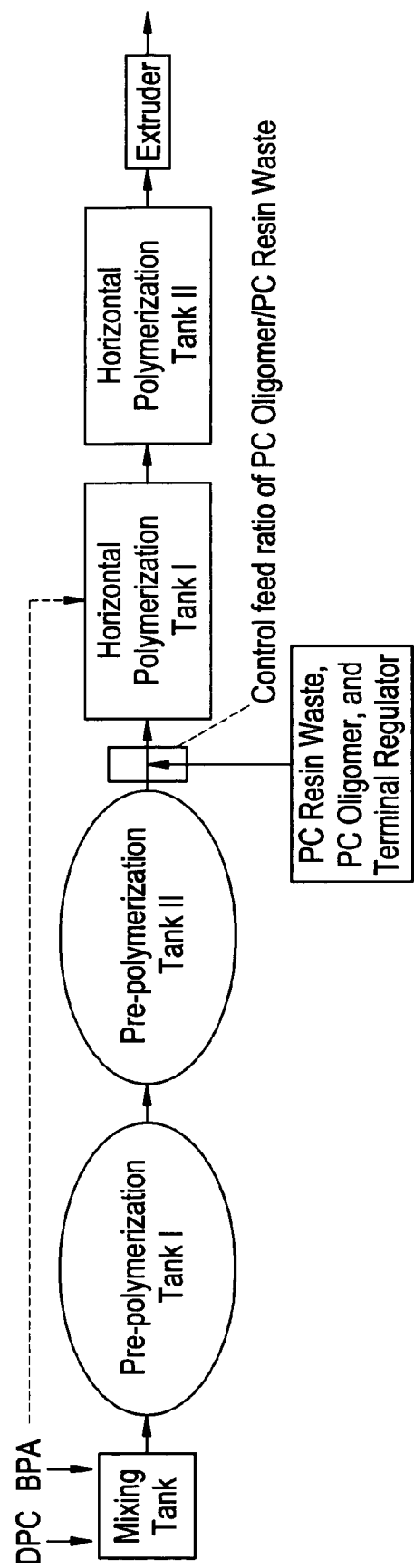
FIG. 4 is a flow diagram representing an embodiment of the disclosed recycling method for polycarbonate waste resin in III condition.

In condition III, an example of which is illustrated in FIG. 4, the preparation of polycarbonate waste uses continuous fusion polycondensation reactor where the reactors are connected in series. In this embodiment, the waste polycondensation resin in which terminal OH concentration is adjusted, is supplied from the outlet of a polymerisation reactor in the first step of the polycondensation process (oligomerisation process) to carry out transesterification reaction and/or polycondensation reaction between the waste resin supplied and the resin being prepared in the second stage of the polycondensation process.

FIG. 1 represents the first stage polycondensation process (in other words, after the preparation of oligomer). It is a schematic diagram of polymerization reactor used in recycling method for polycarbonate resin. The polymerization reactor is equipped with agitator tank, prepolymerization tank I, prepolymerization tank II, horizontal polymerization tank I, horizontal polymerization tank II, and extruder and resin waste fusion apparatus. The polymerization material (e.g., bisphenol A (BPA) and diphenyl carbonate (DPC)) and catalyst are supplied to agitator tank, and after agitating it at specific speed, it is supplied to prepolymerization tanks I and II in order. The obtained low polycondensed oligomer is supplied to horizontal tanks I and II. The molten polycarbonate resin waste in resin waste fusion apparatus is supplied to the outlet of prepolymerization tank II, and later to horizontal polymerization tank, and it continues until polycondensation reaction attains predetermined intrinsic viscosity.

The terminal OH concentration of polycarbonate waste resin is generally about 200 to about 25,000 ppm, per unit weight of polycarbonate oligomer contained in transesterification reaction. In another embodiment, the terminal OH concentration of polycarbonate waste resin is about 500 to about 20,000 ppm per unit weight of polycarbonate oligomer contained in transesterification reaction.

The terminal OH concentration of polycarbonate waste resin can be adjusted before being subjected to either of the transesterification reaction or the polycondesation reaction, by adding suitable amount of aliphatic, alicyclic, or aromatic compounds, dihydroxy compounds, compounds with OH group, or carbonic acid diesters, such as diphenyl carbonate.

There is no restriction for the OH concentration of polycarbonate oligomer during the addition of polycarbonate resin waste in III condition.

In the above mentioned conditions I to III, in order to reuse resin waste effectively, a lower amount of polycarbonate oligomer is preferable. For example, in one exemplary embodiment, 0 to 10,000 parts by weight of polycarbonate oligomer to 100 parts by weight polycarbonate resin waste will be present. In another exemplary embodiment, 0 to 200 parts by weight of polycarbonate oligomer to 100 parts by weight polycarbonate resin waste will be present.

In the above-mentioned conditions I to III, a terminal regulator can be added during the addition of resin waste. The above mentioned aromatic dihydroxy compound is preferred as terminal regulator, specifically bisphenol A. As an amount of terminal regulator, the OH concentration of the transesterification process is about 200 to about 25,000 ppm, in one exemplary embodiment, about 500 to about 20,000 ppm, per unit weight of polycarbonate resin waste and oligomer.

The terminal regulator can be added during the melting of polycarbonate resin waste, or it can be added separately. During the addition of polycarbonate resin waste, additional monomer, catalyst, and oligomer, can also be added.

After the polycondensation reaction of polycarbonate, the product can be blended with additive agent and pelletized.

In polycondensation process, polycarbonate resin waste can be added in a first step, or in multiple steps.

The obtained polycarbonate has an intrinsic viscosity of about 0.10 to about 1.0 dl/g, in one exemplary embodiment about 0.30 to about 0.65 dl/g.

According to the above-mentioned recycling method, polycarbonate with improved colour can be prepared efficiently, suppressing the formation of the Branches (I) and (II) set forth below to the maximum extent.

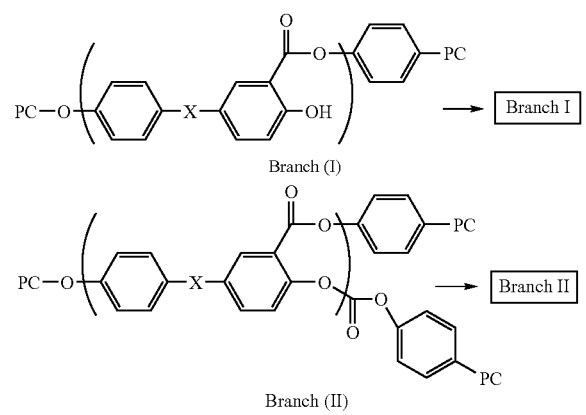

Branch (I)

Branch (II)

wherein X stands for a straight chain or branched hydrocarbon group.

When a polycarbonate is prepared by the disclosed recycling method, the formation of the above-mentioned Branches (I) and (II) can be minimized. The reason is believed to be that the waste resin already has a suitably high molecular weight and therefore requires lesser heat energy and less retention time at high temperature compared to polymerisation of monomers.

In the disclosed method, sulphur-containing acidic compounds and/or derivatives of such compounds with a pKa of less than or equal to about 3, as specified below (hereinafter referred as "acidic compounds") can be added immediately after the polycondensation, without cooling the reaction product polycarbonate.

Suitable sulphur containing acidic compound and their derivatives include sulphurous acid, sulphuric acid, sulphinic acid compounds, sulphonic acid compounds, and their derivatives. Illustrative examples are ethyl benzene sulphonate, butyl benzene sulphonate, methyl p-toluene sulphonate, ethyl p-toluene sulphonate, and butyl p-toluene sulphonate.

These acidic compounds may be used to the extent of about 0.1 to about 50 moles per mole of the total alkali metal component used as the catalyst for the above mentioned polycarbonate reaction. In one exemplary embodiment, these acidic compounds may be used to the extent of about 0.1 to about 15 moles, and in another exemplary embodiment, about 0.1 to about 7 moles, per mole of the total alkali metal component used as the catalyst for the above mentioned polycarbonate reaction. Adding these acidic compounds to the reaction product (polycarbonate) neutralises or deactivates the residual phosphite of the alkali metal compound, improving the retention stability and water resistance of the obtained polycarbonate.

Polycarbonate can be molded using ordinary kneaders, such as monoaxial extruders, biaxial extruders, static mixers, etc. Both the kneaders, with or without vents, can be used effectively.

Polycarbonate can contain additives to the extent that they do not adversely affect the advantages of the disclosed method.

The additive(s) that may be used are those generally added to polycarbonate depending on the purpose of their application. Illustrative examples include heat resistance stabilisers, epoxy compounds, UV absorbents, mold lubricants, pigments, antistatic agents, slipping agents, antiblocking agents, lubricants, defogging agents, natural oils, synthetic oils, wax, organic and inorganic fillers, etc.

Polycarbonates prepared in this manner are pelletized, if needed, before they are used in various applications. The obtained polycarbonate has superior colour and is suitable for various fields, such as optical materials. It has been found that the direct addition of polycarbonate resin waste to a fusion polycondensation apparatus and subsequent reaction without an initial depolymerisation step results in the obtainment of polycarbonate that is on a par with product obtained using only virgin materials.

According to the disclosed recycling method, polycarbonate resins prepared by fusion polycondensation can be recycled without subjecting polycarbonate resin waste to cumbersome operations like depolymerisation and extraction of oligomer components. The obtained polycarbonate resin has substantially the same characteristics as virgin resin containing no recycled elements. In addition, the disclosed recycling method minimizes the formation of branches and improves resin color.

Hereinafter, use of polycarbonate waste resin is explained by some embodiments that are meant to be exemplary, not limiting.

The physical properties of embodiments and comparative examples were measured by the methods listed below.

The intrinsic viscosity (IV) of polycarbonate was measured in methylene chloride of 0.5 dl/g concentration at 20° C. using a Ubbelohde viscometer. And viscosity average molecular weight ($M_v$) was determined by following equation.

$$IV = 1.23 \times 10^{-4} \times (M \times 1.68)^{0.83}$$

The terminal OH group concentration of polycarbonate was measured by dissolving 0.4 grams (g) of the polycarbonate sample in 3 milliliters (ml) of chloroform and the percentage (%) of OH groups in the total terminal groups determined by $^{13}C$-NMR.

In order to determine the extent of Branches (I) and (II) in the polycarbonate, the sample was first hydrolysed with alkali and subjected to high performance liquid chromatography (HPLC) to determine the amount of the

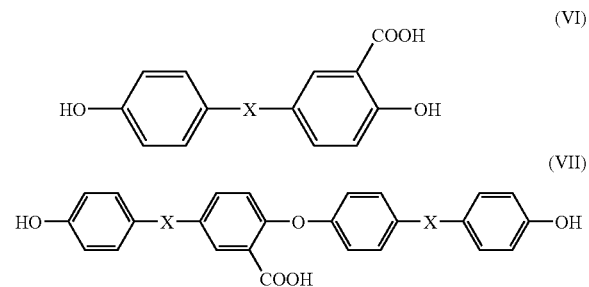

wherein X stands for a straight chain or branched hydrocarbon group.

The IV, $M_v$, the terminal OH group concentration, terminal end capping type of samples (polycarbonate oligomer, polycarbonate resin waste) are shown in Table 1.

TABLE 1

| | IV (dl/g) | Terminal OH concentration | $M_v$ | OH parts by weight concentration (ppm) |
|---|---|---|---|---|
| Polycarbonate oligomer | 0.155 | 32 | 3,237 | 3,361 |
| Polycarbonate waste resin I | 0.353 | 5 | 8,726 | 195 |
| Polycarbonate waste resin II | 0.353 | 19 | 8,726 | 740 |
| Bisphenol A | — | — | 228 | 149,123 |

COMPARATIVE EXAMPLE 1 (C1)

100 parts by weight of polycarbonate oligomer (IV is 0.155 dl/g, terminal OH group concentration was 3,361) was fed to the flask equipped with a stirrer. It was vacuum deareated and replaced with nitrogen. This was repeated thrice using a catalyst (NaOH, 100 ppb as Na). It was stirred at a pressure of 2 torr at 310° C. while the evaporation of phenol and polymerisation was carried out. The intrinsic viscosity, terminal OH group concentration, and amount of branched compound of obtained polymerised product were evaluated. The results are shown in Table 2.

COMPARATIVE EXAMPLE 2 (C2)

100 parts by weight of polycarbonate resin waste (I) (spool during the molding of compact disk) having IV 0.155 dl/g, terminal OH group concentration 5%, t-butylphenol terminal was fed to the flask equipped with a stirrer. It was vacuum deareated and replaced with nitrogen. This was then repeated thrice using a catalyst (NaOH, 100 ppb as Na). It was stirred at a pressure of 2 torr at 310° C. while the evaporation of phenol and polymerisation was carried out for 30 minutes. The intrinsic viscosity, terminal OH group concentration, and amount of branched compound of obtained polymerised product were evaluated.

EMBODIMENT 1 (E1)

The polymerization was carried out as per Comparative Example 2, except using 100 parts by weight polycarbonate resin waste (II) having IV 0.353 dl/g, terminal OH group concentration of 740 ppm, phenol terminal. The intrinsic viscosity, terminal OH group concentration, and amount of branched compound of obtained polymerised product were evaluated. The results are shown in Table 2.

EMBODIMENT 2 (E2)

50 parts by weight of polycarbonate oligomer (IV is 0.155 dl/g, terminal OH group concentration was 3,361 ppm), and above mentioned 50 parts by weight polycarbonate resin waste (II), t-butylphenol terminal, were fed to the flask equipped with a stirrer. It was vacuum deareated and replaced with nitrogen. This was then repeated thrice using catalyst (NaOH, 100 ppb as Na). It was stirred at a pressure of 2 torr at 310° C. for 30 minutes while evaporating phenol and polymerisation was carried out. The intrinsic viscosity, terminal OH group concentration, and amount of branched compound of obtained polymerised product were evaluated. The results are shown in Table 2.

EMBODIMENT 3 (E3)

Polymerisation was carried out as Embodiment 2 except adding 1.05 parts by weight bisphenol A as terminal regulator. The intrinsic viscosity, terminal OH group concentration, and amount of branched compound of obtained polymerised product were evaluated. The results are shown in Table 2.

EMBODIMENT 4 (E4)

After carrying out the polymerization under the conditions of Embodiment 2, it was polymerized again by stirring for 30 minutes at 310° C. at a pressure of 0.8 torr, while evaporating off the phenol. The intrinsic viscosity, terminal OH group concentration, and amount of branched compound of obtained polymerised product were evaluated. The results are shown in Table 2.

EMBODIMENT 5 (E5)

Polymerisation was carried out as Embodiment 4 except adding 1.05 parts by weight bisphenol A as terminal regulator. The intrinsic viscosity, terminal OH group concentration, and amount of branched compound of obtained polymerised product were evaluated. The results are shown in Table 2.

TABLE 2

|  | C1 | C2 | E1 | E2 | E3 | E4 | E5 |
|---|---|---|---|---|---|---|---|
| Terminal OH group concentration (%) | — | 5 | 19 | 5 | 5 | 5 | 5 |
| Additive agent (pbw) | — | 100 | 100 | 50 | 50 | 50 | 50 |
| Physical properties after polymerization | | | | | | | |
| IV (dl/g) | 0.48 | 0.36 | 0.42 | 0.38 | 0.40 | 0.46 | 0.51 |
| $M_v$ | 12,636 | 8,935 | 10,758 | 9,536 | 10,144 | 12,004 | 13,593 |
| Terminal OH group concentration (ppm) | 350 | 152 | 474 | 357 | 804 | 283 | 575 |
| Branched compound (I) | 1,220 | 20 | 780 | 310 | 420 | 490 | 950 |
| Branched compound (II) (ppm) | 40 | <10 | <10 | <10 | <10 | <10 | 20 |

Even though the polycarbonate resin waste has more thermal history than virgin polycarbonate that results in heat degradation and decreased mechanical properties, articles produced using the polycarbonate resin waste as taught herein have substantially similar properties as products formed solely from virgin polycarbonate (i.e., polycarbonate with no heat history from molding).

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the disclosed method not be limited to the particular embodiment disclosed as the best mode contemplated for carrying out this invention, but that the disclosed method will include all embodiments falling within the scope of the appended claims.

What is claimed is:

1. A method of recycling polycarbonate resin waste, comprising:
    combining a polycarbonate oligomer and a polycarbonate waste component to form a polycarbonate polycondensation component, wherein the polycarbonate oligomer is the reaction product of a dihydroxy compound and a carbonate diester;
    subjecting the polycarbonate waste component to one or both of a transesterification reaction and a polycondensation reaction, wherein the polycarbonate waste component has an OH group concentration and comprises polycarbonate resin waste; and
    changing an OH group concentration of the polycarbonate waste component to suppress the formation of a branched compound, wherein the OH group concentration is changed before subjecting the polycarbonate waste component to either of the transesterification reaction or the polycondensation reaction.

2. The recycling method of claim 1, wherein the polycarbonate waste component further comprises additional polycarbonate oligomer.

3. The recycling method of claim 1, wherein the OH group concentration is a terminal OH group concentration.

4. The recycling method of claim 1, further comprising introducing the polycarbonate waste component and a material to a prepolymerization tank, wherein the material is selected from the group consisting of a dihydroxy compound, a carbonate diester, reaction products of a dihydroxy compound and a carbonate diester, and combinations comprising at least one of the foregoing materials.

5. The recycling method of claim 1, wherein the polycarbonate waste component comprises an aromatic polycarbonate comprising bisphenol-A.

6. The recycling method of claim 1, further comprising adding a terminal regulator during one or both of the transesterification and polycondensation reactions.

7. The recycling method of claim 6, wherein the terminal regulator comprises an aromatic dihydroxy compound.

8. The recycling method of claim 7, wherein the aromatic dihydroxy compound comprises bisphenol-A.

9. A method of recycling polycarbonate resin waste, comprising:
    combining a polycarbonate oligomer and a polycarbonate waste component to form a polycarbonate polycondensation component, wherein the polycarbonate waste component has an OH group concentration and comprises polycarbonate resin waste;
    subjecting the polycarbonate polycondensation component to one or both of a transesterification reaction and a polycondensation reaction; and
    changing an OH concentration of the polycarbonate waste component such that a combined OH concentration of the polycarbonate waste component and the polycarbonate oligomer, before the transesterification reaction and the polycondensation reaction, is about 200 to about 25,000 ppm per unit weight of the polycarbonate waste component.

10. The recycling method of claim 9, wherein the combined OH concentration is about 500 to about 20,000 ppm per unit weight of the polycarbonate waste component.

11. The recycling method of claim 10, wherein the combined OH concentration is about 500 to about 10,000 ppm per unit weight of the polycarbonate waste component.

12. The recycling method of claim 1, which results in a polycarbonate product having an intrinsic viscosity of 0.1 to 1.0 dl/g.

13. A method of recycling polycarbonate resin waste, comprising:
    introducing a dihydroxy compound and a carbonate diester to a mixing tank to form a mixing tank composition;
    directing the mixing tank composition to a prepolymerization tank to form a prepolymerization composition;

melting a polycarbonate waste component, wherein the polycarbonate waste component has an OH group concentration and comprises polycarbonate resin waste;

combining the prepolymerization composition with the melted polycarbonate waste component to form a combination;

changing the OH group concentration of the polycarbonate waste component to suppress the formation of a branched compound and/or to attain a target polymerization speed;

polymerizing the combination to form a polycarbonate product; and extruding the polycarbonate product.

14. The recycling method of claim 13, wherein the OH group concentration is adjusted before polymerizing the combination.

15. The recycling method of claim 13, wherein the OH group concentration is adjusted before combining the prepolymerization composition with the melted polycarbonate waste component.

16. The recycling method of claim 13, wherein the polycarbonate waste component further comprises polycarbonate oligomer.

17. The recycling method of claim 13, comprising adjusting the OH group concentration while polymerizing the combination.

18. The recycling method of claim 17, wherein adjusting the OH group concentration further comprises adding a terminal regulator.

19. The recycling method of claim 17, wherein the terminal regulator comprises an aromatic dihydroxy compound.

20. The recycling method of claim 18, wherein the aromatic dihydroxy compound comprises bisphenol-A.

21. The recycling method of claim 13, wherein, before polymerizing the combination, a combined OH concentration of the polycarbonate resin waste and the polycarbonate oligomer is about 200 to about 25,000 ppm per unit weight of the polycarbonate waste component.

22. The recycling method of claim 21, wherein the combined OH concentration is about 500 to about 20,000 ppm per unit weight of the polycarbonate waste component.

23. The recycling method of claim 22, wherein the OH wherein the combined OH concentration is about 500 to about 10,000 ppm per unit weight of the polycarbonate waste component.

24. The recycling method of claim 13, wherein adjusting the OH group concentration comprises controlling the amount of polycarbonate waste component combined with the prepolymerization composition.

25. A method of recycling polycarbonate resin waste, comprising:

combining a reaction product polycarbonate oligomer and a polycarbonate waste component to form a polycarbonate polycondensation component, wherein the reaction product polycarbonate oligomer is the reaction product of a dihydroxy compound and a carbonate diester;

subjecting the polycarbonate waste component to one or both of a transesterification reaction and a polycondensation reaction, wherein the polycarbonate waste component has an OH group concentration and comprises polycarbonate resin waste; and changing an OH group concentration of the polycarbonate waste component to attain a target polymerization speed, wherein the OH group concentration is changed before subjecting the polycarbonate waste component to either of the transesterification reaction or the polycondensation reaction.

* * * * *